May 9, 1950   C. S. ASH   2,507,134
DUAL WHEEL MOUNTING
Filed June 2, 1948   2 Sheets-Sheet 2

INVENTOR
CHARLES S. ASH
BY
Morgan, Finnegan & Durham
ATTORNEYS

Patented May 9, 1950

2,507,134

UNITED STATES PATENT OFFICE 2,507,134

DUAL WHEEL MOUNTING

Charles S. Ash, Milford, Mich.

Application June 2, 1948, Serial No. 30,657

10 Claims. (Cl. 301—36)

The invention relates to new and useful improvements in dual wheel assemblies, and more particularly to such improvements in dual, driven, differential, dirigible wheel assemblies.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations, and improvements herein shown and described.

The accompanying drawings, referred to herein and constituting a part hereof, illustrate one embodiment of the invention, and together with the description, serve to explain the principles of the invention.

It is an object of the present invention to provide an improved dual wheel assembly for automotive vehicles in which the two wheels of the assembly are capable of independent relative rotation in order to prevent the dragging of either wheel when the vehicle is travelling around a corner and the excessive and unnecessary tire wear incident to such dragging. A further object of the invention is the provision in such a wheel assembly of improved bearing and lubricant retaining means. The invention is particularly applicable to driven independently rotatable dual wheel assemblies, and it is an object of the invention to provide therefore improved bearing and housing means for the gearing mechanism of the wheel assemblies.

Figure 1:
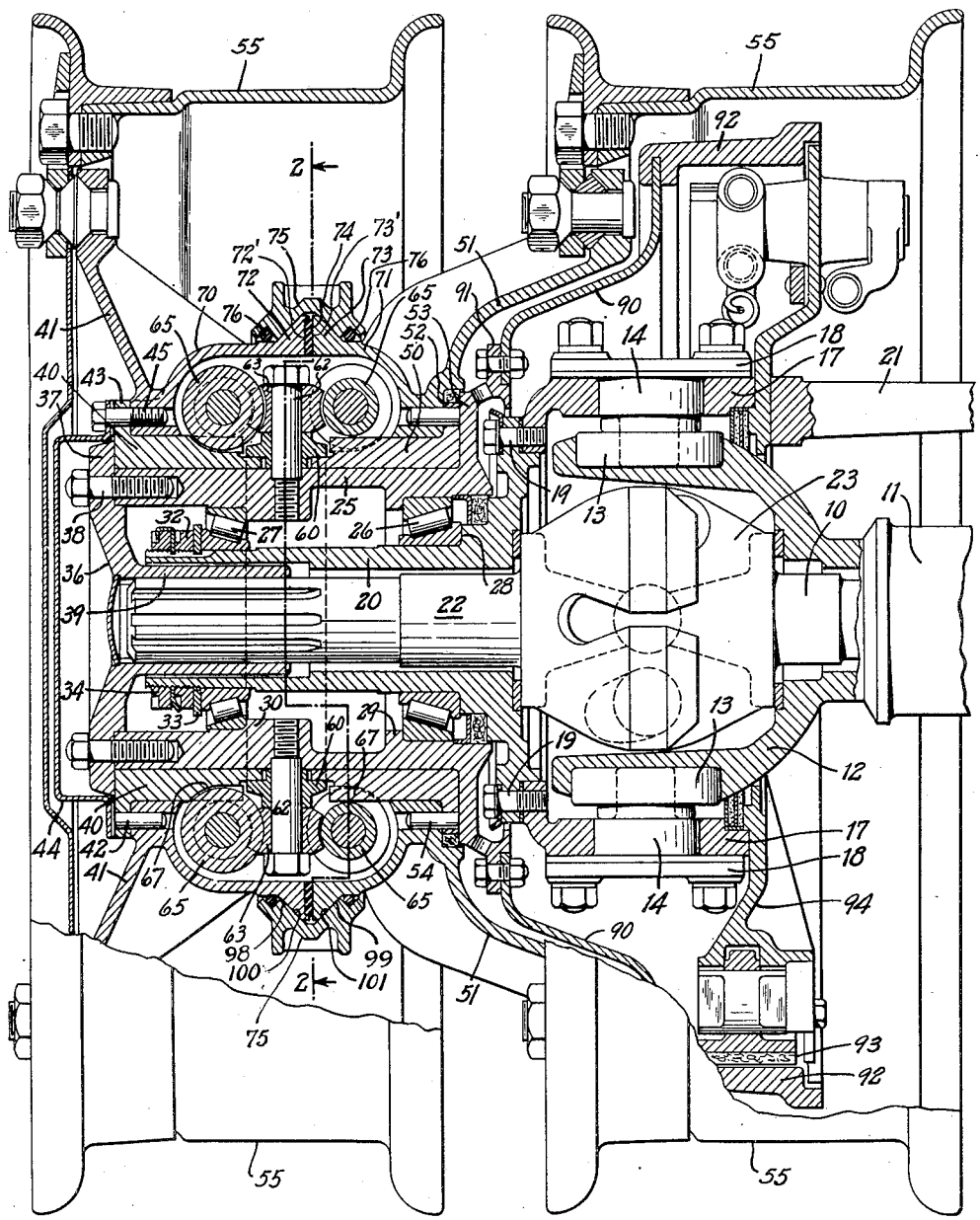
Figure 1 is a vertical sectional view of a dual, driven, differential, dirigible wheel assembly embodying the present invention.

Referring now in detail to the embodiment of the invention shown by way of example in the accompanying drawings, and referring particularly to Figure 1, the live axle shaft 10 of an automotive vehicle is mounted in the hollow axle housing 11, it being understood that the members of the dual wheel assembly herein shown and described are duplicated at the opposite end of the axle housing 11 on the other side of the vehicle. A spherical knuckle 12 is formed integral with housing 11 at its end, and seated in recessed portions at the top and bottom of the knuckle are bearings 13 in which are journalled the reduced end portion of king pins 14. The outer thickened portions of king pins 14 are seated in circular apertures in yoke arms 17 and maintained therein by cap plates 18 which are firmly secured to the yoke arms.

The yoke arms 17 at their outer ends carry by means of cap screws 19 the hollow stub spindle 20, and a steering arm 21 is connected to the upper yoke arm in order to impart steering movement to spindle 20 by means of any conventional and suitable steering gear mechanism. Within the spindle 20 is positioned the live stub shaft 22 to furnish power to the dual wheels of the assembly, said shaft receiving its power from the live axle 10 through a suitable universal joint, which in Figure 1 is indicated by the numeral 23 and is shown as a "Marmon-Herrington" construction.

A cylindrical driving sleeve 25 of greater diameter than the spindle 20 is positioned over the spindle and is rotatably mounted thereon by means of tapered roller bearings 26 and 27. The inner bearing 26 is seated by its inner race against a substantial shoulder 28 of the spindle 20, and by its outer race against an inwardly extending annular shoulder 29 of the driving sleeve 25. The other or outer tapered roller bearing 27 has its outer race seated against a second inwardly extending annular shoulder 30 of the driving sleeve. A retaining nut 32 threaded on the end of spindle 20 with an interposed washer 33 engages the inner race of bearing 27 and holds the bearings and driving sleeve in place upon the spindle. A lock nut 34 may also be threaded on the end of the spindle. The bearings 26 and 27 are thus firmly positioned for the function of anti-friction and anti-thrust between the spindle 20 and the driving sleeve 25. A driving connection is established between the live stub shaft 22 and the driving sleeve 25 by means of the member 36 which has an annular portion 37 secured to the sleeve by means of bolts 38 and a cylindrical portion 39 which has inwardly projecting teeth to mesh with the end of the stub shaft which is formed as a broad face pinion gear.

The outer wheel hub 40 is journalled on the outer end of driving sleeve 25 for relative rotation with respect thereto, and the outer wheel 41 is supported on the hub 40 and secured for rotation therewith by means of pins 42 which extend through a flange portion 43 of the hub and into a suitable aperture in the wheel. The pins 42 are maintained in place by a cover plate 44 which extends over the end of the stub shaft and driving sleeve assembly, and is secured to flange 43 of the outer wheel hub 40 by a plurality of cap screws 45. The hub 40 abuts against the annular portion 37 of the member 36 which maintains the hub in place upon the driving sleeve and acts as a thrust bearing between the members.

The inner wheel hub 50 is journalled on the inner end of driving sleeve 25 for relative rotation with respect thereto, and supports the deeply inwardly dished inner wheel 51. The hub 50 has a flange portion 52 which abuts against an integral outwardly extending flange portion 53 of the driving sleeve 25, whereby the hub is maintained in position and a thrust bearing effected. A plurality of pins 54 extending through flange 52 and into wheel 51 near its inner periphery secures the wheel to its hub for rotation therewith. Each of the vehicle wheels 41, 51 is provided with a suitable pneumatic tire supporting rim 55 and means of any convenient type for demountably mounting the tire rim on the wheel.

Figure 3:
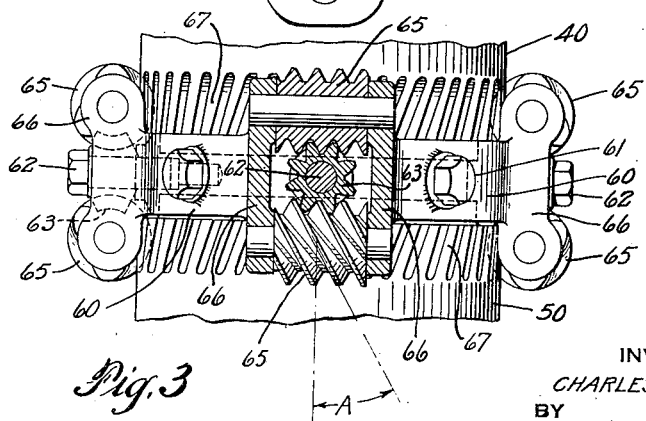
Figure 3 is a detail plan view of certain of the differential means of the invention taken along line 3—3 of Figure 2.

The differential driving means between the driving sleeve 25 and the wheels 41, 51 of the assembly may illustratively comprise a spider ring 60 which is fixed to driving sleeve 25 at a position between the inner and outer wheel hubs for rotation therewith. A plurality of circumferentially spaced cap screws 61 pass through apertures provided in the spider ring and are securely threaded into driving sleeve 25 in the thickened central portion thereof provided by the shoulder 30. Other longer cap screws 62 are similarly positioned in the spider ring 60 and driving sleeve 25 and have rotatably mounted about the outer portion of their length the helical pinion idler gears 63 of the differential means. Each such helical pinion idler gear is in mesh with a pair of worm pinion gears 65, which are positioned on either side of the idler gear axially of the driving sleeve 25. The worm pinions 65 are rotatably mounted in transverse hangers 66 which are an integral part of spider ring 60. The ends of the inner and outer wheel hubs 40 and 50 adjacent spider ring 60 are formed with helical teeth 67, as shown in Figure 3, to form a helical worm gear as an integral part of each hub, and the helical teeth 67 are in mesh with the worm pinion gears 65.

The advantage of the differential means of the present invention embodying the worm pinion gears 65 and helical pinion idler gears 63 over the more conventional type of differential wherein bevel pinion gears only are utilized is in the fact that the former is more sluggish in its operation. That is, the worm pinion type differential provides more resistance to the movement of one wheel by the movement of the other through the worm pinion gears 65 and the helical pinion idler gears 63, due to the wedging or sliding action in the mesh of the gears. Such resistance is desirable and necessary in a wheel assembly such as that of the present invention, where it may occur on uneven or slippery surfaces that one of the wheels of the assembly may have sufficient traction with the ground while the other has little or none.

When such conditions are encountered with the assembly of the present invention ample power may still be continuously transmitted to the wheel with the better traction although some power is lost in the ineffective rotation or slipping of the wheel without traction. The more conventional type of differential, such as is shown in the prior patent to Rumpler, German No. 466,062, however, would transmit substantially the whole power to the ineffective wheel and result in the stalling of the vehicle.

The torque transmission from one wheel to the other through the helical ring gear teeth 67, the spiral pinion gears 65 and the helical pinion idler gears 63 of the assembly of the present invention varies with the helix angle given to the spiral teeth of the spiral pinion gears 63. The helix angle of these gears is indicated by the angle A in Figure 3 of the accompanying drawings and is illustratively shown as 30°. Thus a smaller helix angle will result in a greater torque transmission to one of the wheels by turning the other, and a greater helix angle will result in a lesser torque transmission. The helix angle given to the spiral pinion gears 65 may be as high as 45° and this construction results in the transmission of relatively little torque from one wheel to the other, or stated another way, results in a comparatively free differential action between the individual wheels of the dual wheel assembly. The helix angle chosen may be a smaller one, depending upon the freedom of the differential action desired, but the angle can in no case be smaller than a critical angle beyond which the work pinion gears become "non-reversible." By "non-reversible" is meant a condition where full torque is transmitted to one wheel by the turning of the other, and in this condition the wheels are as effectively locked against the desired differential action as though they were bolted together, as is the case with non-independently rotatable dual wheel structures. Such an effect destroys completely the advantages of the independently rotatable dual wheel structure and is, therefore, to be avoided.

The helix angle for the worm pinion gears 65 in accordance with the present invention is, therefore, greater than the critical angle at which said worm pinions become "non-reversible," and it has been found that the angle should not be smaller than 20° in order to obtain a differential action between the wheels. Thus, a helix angle between the critical angle and an angle of 45° may be chosen, depending upon the freedom with which it is desired for the differential action to occur, and various helix angles of less than 45° result in differential action which is more or less limited.

Thrust bearing and differential gear protection means are provided on the dual wheels 41 and 51, and as illustratively embodied comprise a curved annular flange member 70 formed integral with the outer wheel 41 at its inner periphery and a similar member 71 of the inner wheel 51. These members 70 and 71 extend toward each other and encircle the worm pinion gears 65, the helical pinion idler gears 63 and the other members of the differential. At their adjacent peripheries the flange members 70, 71 have thickened portions 72 and 73 respectively, on which are formed opposed paralled radial surfaces 72' and 73' respectively which, with an interposed bearing ring 74, form thrust bearings between the dual wheels and serve to properly space the worm pinion gears 65 and the helical pinion idler gears 63. The portions 72, 73 further have formed thereon outward facing bearing surfaces 98 and 99 respectively which are inclined with respect to the axis of the wheels, a 45° angle of inclination being illustrated and preferred.

Figure 2:
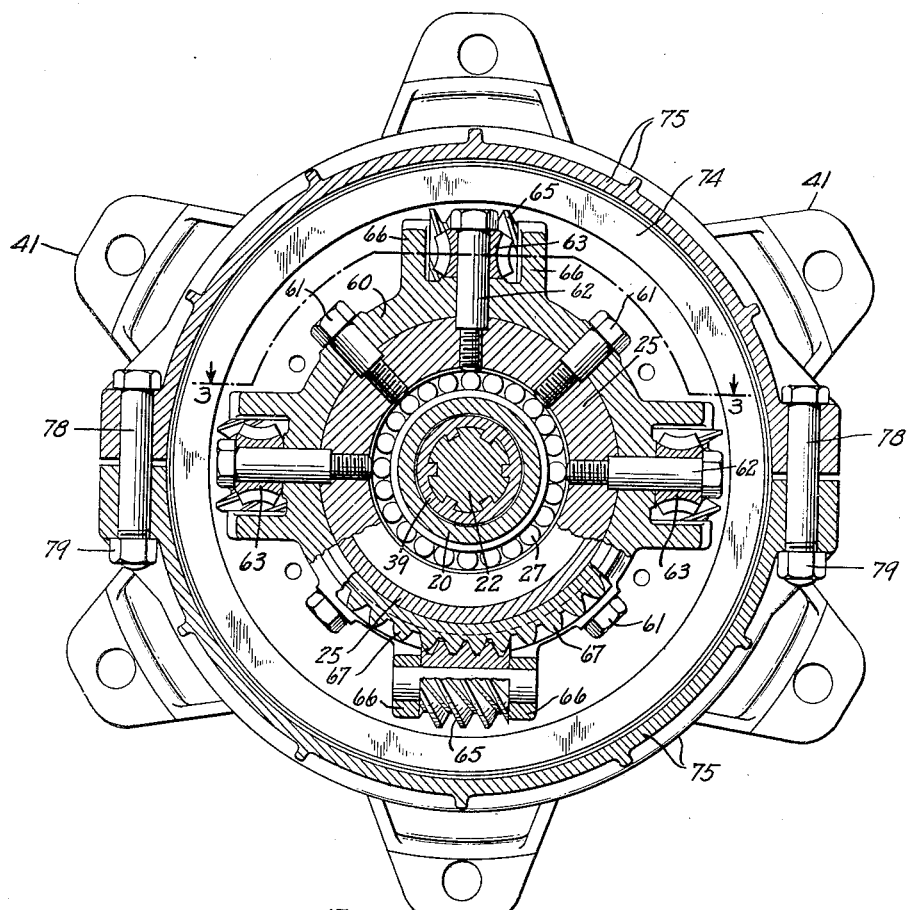
Figure 2 is a cross-sectional view taken along the line 2—2 of Figure 1.

An annular ring 75 of V-cross section encircles the enlarged bearing portions 72, 73 of the wheels, and is formed with grooves adjacent the flange members 70 and 71 in which sealing rings 76 are positioned in order to prevent the loss of lubricating material from the differential housing and the ingress of dust and other harmful substances. The ring 75 is formed in two halves, as may be seen in Figure 2, which are adjustably secured together by bolts 78 and nuts 79. By the engagement of the inclined faces 100 and 101 of ring 75 with the cooperatingly inclined faces 98 and 99 of the enlarged bearing portions 72 and 73 an effective diametrally adjustable bearing is achieved adapted to resist the axial thrust of wheels 41 and 51 away from each other.

Braking means for the dual wheel assembly are provided connected to the driving sleeve 25 so that the retarding action may be transmitted to the individual wheels through the differential mechanism. Thus braking effort is exerted upon both wheels of the assembly, and the advantages which have been described for the differential of the present invention are utilized to the same extent in braking the vehicle as in driving it. As illustratively embodied these means comprise an inwardly dished annular brake drum supporting member 90 which is bolted to an outwardly radially extending radial flange 91 integral with bearing flange 53 of driving sleeve 25, whereby the supporting member 90 rotates with the driving sleeve. A brake drum 92 is carried by supporting member 90 for rotation therewith, and a brake band 93 is carried by brake anchor member 94 to be expanded by any suitable and conventional means against the inner surface of brake drum 92.

The invention in its broader aspects is not limited to the specific mechanisms shown and described but departures may be made therefrom within the scope of the accompanying claims without departing from the principles of the invention and without sacrificing its chief advantages.

What is claimed is:

1. In a differential dual wheel assembly, in combination, two coaxially supported independently rotatable wheels, said wheels comprising adjacent opposed flange portions, said portions having opposed radially extending bearing surfaces formed thereon, said portions further having outward facing bearing surfaces formed thereon and inclined with respect to the axis of said wheels, and a pair of semi-circular rings interconnected and diametrally adjustable and having inclined converging bearing surfaces adapted to engage said outward facing bearing surfaces.

2. In a differential dual wheel assembly, in combination, a pair of coaxially supported independently rotatable wheels having adjacent portions with opposed radially extending bearing surfaces and other bearing surfaces inclined with respect to the axis of said wheels, and a bearing ring having inclined converging surfaces to engage said other bearing surfaces, said radial and inclined surfaces providing bearings between the wheels for axially directed thrust in either direction.

3. In a differential dual wheel assembly, in combination, a pair of coaxially supported independently rotatable wheels, bearing means between said wheels comprising a pair of bearing members having opposed radially extending surfaces each said member secured with respect to a respective one of said wheels and another pair of bearing surfaces on said members, said other pair of surfaces being inclined with respect to the axis of said wheels, and a bearing ring having inclined converging surfaces to engage said other pair of bearing surfaces, said radial and inclined surfaces providing bearings between the wheels for axially directed thrust in either direction.

4. In a differential dual wheel assembly, in combination, a pair of coaxially supported independently rotatable wheels, bearing means between said wheels comprising a pair of bearing members having opposed radially extending surfaces each said member secured with respect to a respective one of said wheels and another pair of bearing surfaces on said members, said other pair of surfaces being inclined with respect to the axis of said wheels, and a pair of semi-circular rings interconnected diametrally adjustable and having inclined converging bearing surfaces adapted to engage said other pair of bearing surfaces.

5. In a differential dual wheel assembly, in combination, a pair of coaxially supported independently rotatable wheels, bearing means between said wheels comprising a pair of bearing members having opposed radially extending surfaces each said member secured with respect to a respective one of said wheels and another pair of bearing surfaces on said members said other pair of surfaces being inclined with respect to the axis of said wheels, a bearing ring having inclined converging surfaces to engage said other pair of bearing surfaces, and sealing means between either edge of said bearing ring and said wheels.

6. In a differential dual wheel assembly, in combination, a pair of coaxially supported independently rotatable wheels, bearing means between said wheels comprising a pair of bearing members having opposed radialy extending surfaces each said member secured with respect to a respective one of said wheels and another pair of bearing surfaces on said members said other pair of surfaces being inclined with respect to the axis of said wheels, a bearing ring having inclined converging surfaces to engage said other pair of bearing surfaces, and sealing means between either edge of said bearing ring and said bearing means.

7. In a differential dual wheel assembly, in combination, a pair of coaxially supported independently rotatable wheels, means forming an enclosed annular chamber between said wheels comprising a pair of annular elements each secured with respect to one of said wheels and having opposed radially extending bearing surfaces and other bearing surfaces inclined with respect to the axis of the wheels, and a bearing ring having inclined converging surfaces to engage said other bearing surfaces.

8. In a differential dual wheel assembly, in combination, a pair of coaxially supported independently rotatable wheels, means forming an enclosed annular chamber between said wheels comprising a pair of annular elements each secured with respect to one of said wheels and having opposed radially extending bearing surfaces and other bearing surfaces inclined with respect to the axis of the wheels, a bearing ring having inclined converging surfaces to engage said other bearing surfaces and sealing means between either edge of said bearing ring and respective ones of said elements.

9. In a differential dual wheel assembly, in combination, a pair of coaxially supported independently rotatable wheels, means forming an enclosed annular chamber between said wheels comprising a pair of annular elements each secured with respect to one of said wheels and having opposed, outer peripheral, enlarged portions formed with radially extending bearing surfaces and other bearing surfaces inclined with respect to the axis of the wheels, and a bearing ring having inclined converging surfaces to engage said other bearing surfaces.

10. In a differential dual wheel assembly, in combination, a pair of coaxially supported independently rotatable wheels, each of said wheels having an enlarged annular portion said portions each being formed with a radially extending surface adapted to oppose the corresponding surface of the other as a thrust bearing and another surface inclined with respect to the axis of the wheels, and a bearing ring having inclined converging surfaces to engage said inclined surfaces of said portions.

CHARLES S. ASH.

REFERENCES CITED

The following references are of record in the file of this patent:

UNITED STATES PATENTS

| Number | Name | Date |
|---|---|---|
| 2,239,674 | Frederickson | Apr. 29, 1941 |